United States Patent [19]
Banella et al.

[11] Patent Number: 6,060,090
[45] Date of Patent: May 9, 2000

[54] PANETTONE-TYPE BAKERY DOUGH

[75] Inventors: Francesco Banella, Castiglione Del Lago Perugia, Italy; Marlène Gaugaz, Corseaux, Switzerland; Paolo Giorgetti, Pila Perugia, Italy

[73] Assignee: Nestec S.A., Vevey, Switzerland

[21] Appl. No.: 08/944,750

[22] Filed: Oct. 6, 1997

Related U.S. Application Data

[63] Continuation of application No. 08/488,110, Jun. 7, 1995, abandoned.

[30] Foreign Application Priority Data

Jun. 23, 1994 [EP] European Pat. Off. .............. 94109681

[51] Int. Cl.⁷ .............................. A21D 2/08; A21D 8/04
[52] U.S. Cl. ............................................. 426/20; 426/558
[58] Field of Search .............................. 426/94, 549, 558, 426/19, 20

[56] References Cited

U.S. PATENT DOCUMENTS

| | | | |
|---|---|---|---|
| 3,656,967 | 4/1972 | Barton et al. | 99/86 |
| 4,005,225 | 1/1977 | Craig et al. | 426/21 |
| 4,670,272 | 6/1987 | Chen et al. | 426/94 |
| 4,774,095 | 9/1988 | Kleinschmidt et al. | 426/94 |
| 4,824,683 | 4/1989 | Hodgson et al. | 426/62 |
| 4,910,029 | 3/1990 | Thulin et al. | 426/94 |
| 4,950,489 | 8/1990 | Spiller | 426/19 X |
| 5,366,750 | 11/1994 | Morano | 426/572 |
| 5,472,724 | 12/1995 | Williams et al. | 426/497 |

OTHER PUBLICATIONS

Troller et al Food Sci & Tech. A series of monographs, water Activity and Food, pp. 40–44, 1978.

Mancastropper et al FSTA: Pasticceria Internationale vol. 2 (8) 54–56 (1979), Abstract only.

Scarlino FSTA: Technica Molitoria vol. 29 (2) 89–90 (1978) Abstract only.

Orlandi et al FSTA: Revue des Fabricantsde Confisene, Chocol. confiturene, Biscutene, vol. 52(4) 21–26 (1977) Abs. only.

Orlandi FSTA: Industrie Alimentari vol. 16(4)59–66 (1977) abstract only.

Galli et al. FSTA: Annali di microbiolgia ed Enzimologia vol. 23 (1/2/3) 39–49, (1973) Abs. only.

Okada et al Biosci Biotechnol. Biochem 56(4) p. 572–575 (1992) abstract only.

Spicher Z. Lebensm–Unters–Forsch 184(4) p. 300–303 (1987) Abstract only.

Miller, Byron S., "Variety Breads In The United States, Proceedings of a Symposium Presented at the AACC 65th Annual Meeting", Sep. 21–25, 1980, Chicago, Illinois' 1981, American Association of Cereal Chemist, St. Paul Minnesota; p. 132, "Panettone".

Dino Zorzanello et al., "The Technology of Pandoro Production, Italian Christmas Cake"; Baker's Digest, vol. 56, No. 6, 1982, Pontiac, Illinois US, pp. 12–15.

*Primary Examiner*—Arthur L. Corbin
*Attorney, Agent, or Firm*—Pennie & Edmonds LLP

[57] ABSTRACT

Panettone-type bakery dough comprising a mixture of 25–37% of wheat flour, 7–13% of animal or vegetable fat, 0.5–1.5% of malt, 0.5–3.5% of emulsifying agents, 0.1–1% of salt, 10–16% of leaven, 8–15% of egg yolk, less than 6% of sugars, at least 10% of whole or skimmed milk, and water up to a total water content in the dough of 15–25%.

17 Claims, No Drawings

PANETTONE-TYPE BAKERY DOUGH

This is a continuation of application Ser. No. 08/488,110, filed Jun. 7, 1995, now abandoned.

TECHNICAL FIELD

The subject of the present invention is a panettone-type bakery dough, the bakery product obtained by baking this risen dough, and its use for the preparation of a product filled with a sweet or savory filling.

BACKGROUND ART

A panettone dough is traditionally prepared in two steps, the first consisting in mixing some of the ingredients with a reactivated leaven and then in fermenting this mixture, and the second consisting in mixing together the rest of the ingredients. Such a dough may thus be composed of a mixture of 6–10% of reactivated panettone leaven, 25–37% of wheat flour, 8–20% of water, 8–20% of sugars, 0–4% of invert sugar, 3–13% of egg yolk, 7–13% of animal or vegetable fat, 0–1% of powdered skimmed milk, 0.5–1.5% of malt, 0.5–3.5% of emulsifying agents and 0.1–1% of salt, for example (Brot and Backwaren, 3, p. 68, 1989).

This dough is then subjected to a second fermentation, and is then baked in order to give a sweet Viennese-type bakery product, known as panettone, having a characteristic leaven flavor, an airy, soft and elastic texture, and the property of not turning stale under packaging for at least 6 months at room temperature (Dictionnaire des industries alimentaires, J. M. Clement, 1978, Masson).

However, such a Viennese-type bakery product cannot easily be filled with a savory filling.

Similarly, the texture of the panettone is aerated by several air bubbles elongated in a favoured direction, and thus has a unidirectional elasticity. It would, however, be advantageous to obtain a panettone having an elastic texture in all directions.

In addition, the property of the panettone not to turn stale very much depends on the composition of the dough. Notable modifications of its composition, for example the fact of replacing a large part of the water by milk and of reducing the sugar content, are liable to disrupt the two traditional fermentations of the dough, and thus to give a Viennese-type bakery product which no longer has the properties described above. The reason for this is that milk and sugar, for example, are known to be limiting factors in traditional fermentations.

Furthermore, it is also known that the fact of adding a lot of milk to a dough increases the staling property of the bakery product which results therefrom (Tallinna Polueteh-nilise Instituudi Toimetised, 383, 63–70, 1975). Thus, a panettone comprising a large proportion of milk is in all probability liable to lose its property of not turning stale under packaging for several months at room temperature.

Finally, traditional panettone dough is relatively elastic and sticky, which means that it cannot be shaped but has to be placed in a mold so that it does not spread out during the final fermentation and the baking. It would, however, be advantageous to be able to shape it and thus to work it in a traditional dividing-balling machine.

SUMMARY OF THE INVENTION

The aim of the present invention is to propose a panettone-type bakery dough containing a large amount of milk and which may be shaped, and a panettone-type bakery product containing a large amount of milk, having a soft consistency, an elastic texture, a neutral taste, and the property of not turning stale under packaging for an extended period of time at room temperature or at refrigerated temperature.

To this end, the panettone-type bakery dough according to the present invention comprises a mixture of about 25 to 37% of wheat flour, about 7 to 13% animal or vegetable fat, about 0.5 to 1.5% malt, about 0.5 to 3.5% emulsifying agents, about 0.1 to 1% salt, about 8 to 15% egg yolk, about 10 to 16% leaven, less than about 6% sugars, at least about 10% whole or skim milk, and water to a total water content of about 15 to 25% in the dough. Some of the milk be added as a powder or in a dehydrated form, if desired.

DETAILED DESCRIPTION OF THE INVENTION

In the rest of the description the percentages are given by weight.

The expression "panettone-type bakery dough" means a dough which results from a traditional process for the preparation of a panettone dough and in which certain ingredients are present in a traditional proportion, for example 25–37% of flour, 0–4% of inverted sugars, 7–13% of fats, 0–1% of whole or skimmed milk powder, 0.5–1.5% of malt and 0.5–3.5% of emulsifying agents.

Similarly, the expression "panettone-type bakery product" means a bakery product which results from the baking of a panettone-type dough which has risen beforehand for 6–10 hours at 28–32° C. in an atmosphere of 80–95% relative humidity, for example.

In addition, the expression "bakery product having the property of not turning stale" refers to the fact that the texture of the packaged product does not dry out or harden over time, due to a rearrangement of the starch molecules in the product.

Finally, the term "invert sugar" means a mixture in equal parts of fructose and glucose, which has a humectant power. And the term "sugar" is understood to mean glucose, fructose and/or sucrose, for example.

Thus, according to the present invention, it has been possible to obtain a panettone-type dough which can be shaped, that is to say that it can be worked in a traditional dividing-balling machine and can also be placed on a plate without a mold while still retaining a uniform development during fermentation and baking.

Furthermore, this dough which has risen beforehand and has then been baked for 15–20 min at 160–200° C., for example, gives a bakery product of the bread or bread roll type, having an even softer texture than that of panettone, an elasticity in all directions, a neutral taste in comparison with that of panettone, which allows it to be filled with sweet or savory fillings, and the property of not turning stale under packaging for at least 4 months, at room temperature or at refrigerated temperature, that is to say of the order of 4 to 14° C.

Thus, according to the present invention, a panettone-type dough is prepared in a traditional manner, this dough comprising a mixture of 10–16% of leaven, 8–15% of egg yolk, less than 6% of sugars, at least 10% of whole or skimmed milk, and water up to a total water content in the said dough of 15–25%, it then being possible for the rest of the ingredients to vary in traditional proportions without, however, influencing the desired qualities of the dough and of the baked product.

In particular, the leaven has preferably been reactivated in a traditional manner before being used for the preparation of such a dough. Hence, a panettone leaven stored at 4–12° C. may be reactivated, in the form of a lump of pre-baked dough comprising water, flour and the active flora, by mixing some of this leaven with two parts of flour, and then by adding water until a total water content of 35–40% is reached. The mixture thus prepared may then be kneaded for about 3–7 min and can next rise for about 3–4 h, at 26–30° C. and at 85–95% relative humidity. The lump of pre-baked dough thus obtained may then be subjected to two successive mixes and fermentations as described above, for example. A leaven reactivated by three successive mixes and fermentations is preferably used.

The composition of the leaven flora is complex. It appears that 4 species play an important role in fermentation, namely *Saccharomyces cerevisiae*, *Saccharomyces exiguus*, *Lactobacillus brevis* and *Lactobacillus sanfrancisci*. The leaven flora preferably comprise at least 10 times more microorganisms of the genus Lactobacillus than of microorganisms of the genus Saccharomyces.

The panettone-type dough according to the present invention is subsequently prepared according to a traditional process for the preparation of panettone dough. This process may thus consist of first mixing the reactivated leaven with all of the water, some of the flour, some of the milk, some of the sugar, some of the fats, some of the egg yolk, and some of the emulsifying agents of the dough composition according to the present invention.

This first mixture or lump of pre-baked dough, kneaded for about 8–12 min for example, may thus comprise all of the sugar, all of the water, 60–72% of the milk, 60–80% of the flour, less than 35% of the fat content and less than 35% of the egg yolk of the dough according to the present invention. The other ingredients may vary in traditional proportions. This lump of pre-baked dough may finally rise for 10–14 h, at 26–30° C. and in an atmosphere of 85–90% relative humidity, for example. The volume of the lump of pre-baked dough may then increase 3- to 3.5-fold relative to its initial volume.

In a second kneading step, the rest of the ingredients may be added to the risen lump of pre-baked dough. Preferably, the order of addition of the ingredients is well defined and they are above 20° C. in temperature. For example, the rest of the flour may first be added, the mixture kneaded for 3–7 min, then the rest of the ingredients are added and the mixture is kneaded for 3–7 min. A dough having the composition of the dough according to the present invention is thus obtained.

In particular, the whole or skimmed milk used as ingredients may be a fresh milk or a reconstituted milk, that is to say an aqueous suspension comprising 7–12% of whole or skimmed milk powder.

In addition, the dough may also comprise 1–3% of powdered whole or skimmed milk, preferably added during the second kneading.

Similarly, the dough according to the present invention may comprise a humectant chosen from invert sugar and salt, alone or in combination, in an amount such that it imparts a water activity (Aw), equivalent to that of a filling product, to the bread which results from the baking. Thus, invert sugar may be combined in an amount of 2–3% and salt in an amount of 0.5–1.5%, for example. Preferably, 2.2–2.5% of invert sugar and 0.9–1% of salt may be combined in order to obtain an Aw of 0.9 at 10° C. The dough may thus additionally comprise 1–3% of powdered milk in combination with a humectant chosen from invert sugar and salt, alone or in combination.

Similarly, it is preferred to add a large part of the fats and of the egg yolk only during the second step of preparation of this dough, in order to avoid excessive disruption of the first fermentation of the mixture, which plays an important role in the quality of the final dough. These successive additions of ingredients, followed by kneading operations, also allow the starch and the gluten to swell, resulting in the impermeabilization of the dough. This facilitates the retention within the dough of the $CO_2$ produced by fermentation.

Finally, the dough of the present invention may be divided into 20–50 g balls, for example by a traditional dividing-balling machine. The balls of dough may thus be placed on metal plates without molds and made to rise for 7–8 h at 28–32° C. in an atmosphere of 85–90% relative humidity, for example. During this phase, the balls may then double in volume. A risen panettone-type dough is thus finally obtained.

This risen dough may then be baked in an oven for 15–20 min at 160–200° C., for example. A panettone-type bakery product is thus obtained.

The bakery product according to the present invention has all the qualities described above, in particular a texture composed of fine, closely packed, small to medium-sized, round air bubbles, having thin walls, and imparting an elasticity in all directions to the product.

Furthermore, this bakery product may be used for the preparation of a product filled with a savory or sweet filling. The overrun cream described in EP 93100249.7 may preferably be chosen as sweet filling. As savory filling, it is also possible to use ham and cheese, which may be in the form of cream, alone or in combination.

EXAMPLES

The examples below are given by way of illustration of the dough and of the panettone-type bakery product according to the present invention. These examples are preceded by a test for determination of the Aw of the bakery product according to the present invention, by a comparative example of the dough of the present invention, and by two tables respectively describing the nutritional aspect and the preparation of the doughs presented in Examples 1 and 2 and in the comparative example.

Test

The water activity is defined as the ratio between the partial vapour pressure of water at the surface of a sample and the vapour pressure of pure water at the same temperature. The Aw may, however, be determined indirectly by measuring the equilibrium relative humidity reached in a closed chamber at constant temperature.

To do this, a 2–3 g sample of bakery product is closed inside a leaktight container placed in a room thermostatically regulated to 10° C. (Novasina, Switzerland). The empty space around this sample reaches at equilibrium, after 30–60 min, the same Aw value as the sample. The electronic sensor, mounted in the closing lid of the container then measures the humidity of this empty space by means of an electrolytic resistance.

Comparative example

A traditional panettone dough is prepared in the manner described in Table 2 below. Dried raisins and candied fruit are added to this dough in an amount of 21 parts per 79 parts of dough, and the dough is then left to rise and baked in a conventional manner.

The panettone obtained has a characteristic fruity, leaven aroma, a sweet taste, an elastic texture in a plane perpendicular to the direction of rising of the dough, and a harder texture than that of a panettone-type bakery product. The air bubbles of the crumb are. elongated and 2–8 mm in longitudinal size. These air bubbles are less closely packed than those of a panettone-type product according to the present invention, and their walls are also thicker.

Furthermore, this panettone can be stored at room temperature under packaging for at least 6 months without turning stale.

Finally, the nutritional aspect of this panettone is described in Table 1 below.

TABLE 1

| Composition per 100 g of bakery product | Example 1 | Example 2 | Comparative example |
|---|---|---|---|
| Energy (kcal) | 408 | 406 | 393 |
| Proteins (g) | 7.3 | 8.0 | 6.8 |
| Lactic proteins (g) | 1.0 | 1.2 | 0.4 |
| Lipids (g) | 20.4 | 20.0 | 16.8 |
| Carbohydrates (g) | 48.8 | 48.4 | 53.7 |
| Ash (g) | 2.8 | 2.0 | 1.1 |
| Calcium (mg) | 64 | 75 | 43 |

TABLE 2

| | Example 1 | Example 2 | Comparative example |
|---|---|---|---|
| Preparation of the leaven | | | |
| Leaven 1 | | | |
| Initial leaven | 0.223 | 0.273 | 0.168 |
| Water | 0.200 | 0.242 | 0.150 |
| Flour | 0.446 | 0.538 | 0.334 |
| | 0.869 | 1.053 | 0.652 |
| Leaven 2 | | | |
| Leaven 1 | 0.869 | 1.053 | 0.652 |
| Water | 0.744 | 0.897 | 0.557 |
| Flour | 1.654 | 1.994 | 1.237 |
| | 3.267 | 3.944 | 2.446 |
| Leaven 3 | | | |
| Leaven 2 | 3.267 | 3.944 | 2.446 |
| Water | 2.648 | 3.192 | 1.981 |
| Flour | 5.885 | 7.094 | 4.403 |
| | 11.8 | 14.23 | 8.83 |
| Preparation of the dough | | | |
| First kneading | | | |
| Leaven 3 | 11.8 | 14.23 | 8.83 |
| Flour | 26.1 | 22.8 | 26.6 |
| Water | 7.1 | 3.78 | 12.29 |
| Milk | 7.2 | 10.91 | — |
| Sugar | 5.9 | 5.55 | 5.56 |
| Butter | 4.1 | 3.5 | 3.64 |
| Egg yolk | 3.30 | 4.55 | 3.64 |
| Emulsifying agents | 1.73 | 1.50 | 1.56 |
| | 67.23 | 66.82 | 62.11 |
| Second kneading | | | |
| First mixture | 67.23 | 66.82 | 62.11 |
| Flour | 8.4 | 8.03 | 8.94 |
| Butter | 7.9 | 6.7 | 5.29 |
| Egg yolk | 6.4 | 8.45 | 7.8 |
| Water | — | — | 2.66 |
| Milk | 2.9 | 3.04 | — |
| Malt | 0.9 | 0.91 | 0.93 |
| Salt | 1 | 0.95 | 0.36 |
| Emulsifying agent | 1.57 | 1.3 | 1.84 |
| Milk powder | 1.5 | 1.4 | 0.93 |
| Invert sugar | 2.2 | 2.4 | 3.82 |

TABLE 2-continued

| | Example 1 | Example 2 | Comparative example |
|---|---|---|---|
| Sugar | — | — | 5.12 |
| Flavourings | — | — | 0.21 |
| Total | 100.000 | 100.000 | 100.000 |

EXAMPLE 1

A panettone-type dough is prepared, comprising a mixture of 11.8% of reactivated leaven, 34.5% of wheat flour, 7.1% of water, 10.1% of milk, 9.7% of egg yolk, 3.3% of emulsifying agents, 12% of fats, 5.9% of sugars, 1.5% of powdered milk, 0.9% of malt, 2.2% of invert sugar and 1% of salt. The proportions of the various ingredients are described in Table 2 above, for each step of the preparation of the dough.

This dough is prepared in a traditional manner as follows. Firstly, the panettone leaven stored at 10° C. in the form of a lump of pre-baked dough is reactivated by mixing one part with two parts of flour and by adding water until a total water content of 40% is reached. The mixture is then kneaded for about 5 min, and then rises by fermentation for about 3 hours 30 min at 28° C. and at 90% relative humidity. The lump of pre-baked dough thus obtained is then subjected to two identical successive mixes and fermentations, as described in Table 2.

In a second stage, some of the ingredients are added to the reactivated lump of pre-baked dough, as described in Table 2. The mixture then rises for 12 hours at 28° C., in an atmosphere of 90% relative humidity. The volume of the lump of pre-baked dough increases about 3.5-fold relative to its initial volume.

The rest of the ingredients are then mixed into the lump of pre-baked dough, by first adding the flour and kneading the mixture for about 5 min, and then by adding the rest of the ingredients and kneading the mixture for about a further 5 min. A dough having the composition described above is thus obtained, which dough is then left to stand for about 15 min.

After standing, this dough is next divided into portions and then into 25 g balls by a traditional bakery dividing-balling machine. These balls are next simply placed on a flat metal plate and then left to rise in a traditional manner. The balls of dough double in volume.

The risen balls of dough are next baked at 185° C. for 17 minutes. A panettone-type bakery product is then obtained.

This panettone-type bakery product has a neutral taste, that is to say one which is both sweet and savory, which may thus go with savory or sweet fillings. Furthermore, the characteristic aroma of leaven is barely perceptible.

The texture is also very soft. The elasticity of the texture is present in all directions. Finally, the air bubbles of the crumb are relatively round, are from 1–3 mm in diameter, are also relatively closely packed, and have relatively thin walls.

This panettone-type bakery product also keeps well at room temperature under packaging for at least 4 months without turning stale.

Finally, the nutritional aspect of this product is described in Table 1 above.

EXAMPLE 2

A panettone-type dough is prepared, this dough comprising a mixture of 14.23% of leaven, 30.8% of wheat flour, 3.8% of water, 13.95% of milk, 13% of egg yolk, 2.8% of emulsifying agents, 10.2% of fat, 5.55% of sugar, 1.4% of powdered milk, 0.91% of malt, 2.4% of invert sugar and 0.95% of salt.

In order to do this, the leaven, the dough and the panettone-type bakery product are prepared in the same manner as that described in Example 1. The amounts of ingredients added in each step are described in Table 2 above.

The bakery product obtained has the same characteristics as those described in Example 1. The nutritional aspect of this product is described in Table 1 above.

EXAMPLE 3

The panettone-type bakery product of Example 1 is filled with a sweet overrun cream described in Patent EP 93100249.7. This cream has an Aw of 0.9 at 10° C.

EXAMPLE 4

The panettone-type bakery product of Example 1 is filled with a traditional meat paste.

EXAMPLE 5

The panettone-type bakery product of Example 1 is filled with a traditional cheese cream.

What is claimed is:

1. Panettone-type bakery dough comprising a mixture of about 25 to 37% flour, about 7 to 13% fat, about 0.5 to 1.5% malt, about 0.5 to 3.5% emulsifying agents, about 0.1 to 1% salt, about 10 to 16% of a leaven comprising at least a 10:1 weight ratio of microorganisms of the genus Lactobacillus to microorganisms of the genus Saccharomyces, about 8 to 15% egg yolk, less than about 6% sugar, at least 10% milk, and water to a total water content of about 15 to 25% in the dough.

2. Dough according to claim 1, wherein said milk is whole milk or skim milk.

3. Dough according to claim 2, wherein the whole or skim milk is a reconstituted milk.

4. Dough according to claim 2, which additionally comprises about 1–3% of powdered milk.

5. Dough according to claim 4, which further comprises a humectant of invert sugar or salt, alone or in combination, in an amount such that it imparts a water activity, equivalent to that of a filling product, to the bakery product which results from the baking of said dough.

6. Dough according to claim 5, which further comprises, in combination, about 2–3% of invert sugar and about 0.5–1.5% of salt.

7. Dough according to claim 5, wherein the humectant comprises, in combination, about 2.2–2.5% of invert sugar and about 0.9–1% of salt, in order to obtain a water activity of 0.9 at 10° C.

8. Dough according to claim 4, wherein said dough includes a humectant in an amount effective to impart a water activity of at least 0.9 at 10° C.

9. Dough according to claim 4, wherein said dough includes a humectant in an amount effective to impart a water activity which is essentially equivalent to that of a filling material which is to be added thereto.

10. Dough according to claim 1, wherein said flour is wheat flour.

11. Dough according to claim 1, wherein said fat is an animal fat or a vegetable fat.

12. Dough according to claim 1, which is obtained by mixing all of the sugar, all of the water, 60 to 72% of the milk, 60 to 80% of the flour, less than 35% of the fat and less than 35% of the egg yolk to form a first mixture, allowing the first mixture to rise to about 3 to 3.5 times its initial volume, adding the remaining ingredients to form a second mixture and allowing the second mixture to rise to form the dough.

13. Dough according to claim 12 wherein the first mixture is allowed to rise for about 10 to 14 hours at about 26 to 30° C. in an atmosphere of about 85 to 90% relative humidity.

14. Dough according to claim 12 where the remaining ingredients are added by first adding the remaining flour to form a third mixture, kneading the third mixture for 3 to 7 minutes, adding all remaining ingredients to the third mixture to form a fourth mixture, and kneading the fourth mixture for 3 to 7 minutes to form the dough.

15. Bakery product obtained by baking the dough of claim 1 which has risen before baking.

16. Bakery product according to claim 15 which is provided with a filling.

17. Bakery product according to claim 16 wherein the filling is a sweet filling or a savory filling.

* * * * *